US012679374B2

(12) United States Patent
Seo

(10) Patent No.: US 12,679,374 B2
(45) Date of Patent: Jul. 14, 2026

(54) VEHICLE CONTROL DEVICE AND METHOD

(71) Applicant: HL Klemove Corp., Incheon (KR)

(72) Inventor: Dongyoon Seo, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 112 days.

(21) Appl. No.: 18/607,285

(22) Filed: Mar. 15, 2024

(65) Prior Publication Data

US 2025/0033643 A1 Jan. 30, 2025

(30) Foreign Application Priority Data

Jul. 28, 2023 (KR) ........................ 10-2023-0098661

(51) Int. Cl.
B60W 30/18 (2012.01)
B60W 40/02 (2006.01)
B60W 40/107 (2012.01)

(52) U.S. Cl.
CPC . B60W 30/18163 (2013.01); B60W 2520/105 (2013.01); B60W 2552/10 (2020.02)

(58) Field of Classification Search
CPC ..... B60W 30/18163; B60W 2520/105; B60W 2552/10; B60W 2720/106; B60W 40/02; B60W 40/107; B60W 2420/403; B60W 2420/408; B60W 2554/402; B60W 2554/4045; B60W 2554/80; B60Y 2300/18166; B60Y 2400/3015; B60Y 2400/3017
USPC .......................................................... 701/93
See application file for complete search history.

(56) References Cited

U.S. PATENT DOCUMENTS

| | | | | |
|---|---|---|---|---|
| 2017/0183013 A1* | 6/2017 | Matsumoto | ........... | B60W 30/16 |
| 2018/0178796 A1* | 6/2018 | Fukuda | ........... | B60W 30/18163 |
| 2020/0377102 A1* | 12/2020 | Kuwahara | ............. | B60W 40/04 |
| 2021/0284145 A1* | 9/2021 | Lee | ........................ | B60W 30/09 |
| 2023/0041319 A1* | 2/2023 | You | ................. | B60W 30/18163 |
| 2024/0025415 A1* | 1/2024 | Shirai | ................... | B60W 30/16 |
| 2024/0051540 A1* | 2/2024 | Aotani | ........... | B60W 30/18163 |

FOREIGN PATENT DOCUMENTS

| | | |
|---|---|---|
| JP | 5758759 B2 | 8/2015 |
| KR | 10-2017-0031917 A | 3/2017 |
| KR | 10-2429502 B1 | 8/2022 |

OTHER PUBLICATIONS

Office Action issued on Dec. 4, 2025, for corresponding Korean Patent Application No. 10-2023-0098661, with its English translation, 10 pages.

* cited by examiner

*Primary Examiner* — Hossam M Abd El Latif
(74) *Attorney, Agent, or Firm* — Hauptman Ham, LLP

(57) ABSTRACT

The present embodiments relate to a vehicle control device and method. A vehicle control device according to an embodiment may include a lane change determiner configured to determine whether of a possibility of a lane change of a vehicle if a lane change operation of the vehicle initiates in a vehicle following control situation, and a controller configured to, if the lane change of the vehicle is possible, determine a required acceleration for changing a following target in the vehicle following control situation depending on a lane change state of the vehicle based on at least one of vehicle behavior information, lane information, and surrounding vehicle detection information.

14 Claims, 10 Drawing Sheets

100

Lane Change Determiner — 110

Controller — 120

*FIG.4*

VEHICLE CONTROL DEVICE AND METHOD

CROSS REFERENCE TO RELATED APPLICATION

This application claims priority from Korean Patent Application No. 10-2023-0098661, filed on Jul. 28, 2023, which is hereby incorporated by reference for all purposes as if fully set forth herein.

TECHNICAL FIELD

An embodiment of the present disclosure relates to a vehicle control device and method.

BACKGROUND

Recently, consumers have been very interested in the performance and safety of vehicles. As demands for vehicle performance, driver convenience, and safety increase, there are continuously proceed research and development on advanced driver assistance systems (ADAS), which control the vehicle and assist the driver in driving the vehicle. For example, the driver assistance system may include various systems such as a cruise control (CC) system for following a target vehicle in front, an automatic emergency braking (AEB) system for braking a vehicle in emergency situations, and a lane keeping assist system (LKAS) for maintaining a vehicle in the driving lane. In particular, in the case of the cruise control system, that is, the vehicle tracking control system or the vehicle following control system, a host vehicle may be controlled to follow a preceding vehicle by controlling a distance to the preceding vehicle and the vehicle speed of the host vehicle.

However, if a lane changing lanes is performed in a vehicle following control situation, there may occur a sudden acceleration and deceleration of the host vehicle as the target vehicle changes, and there may be a possibility of a collision accident.

Therefore, there is a need for a lane change manner to ensure stability and reduce driver discomfort.

SUMMARY

In this background, an object of the embodiments of the present disclosure is to provide a vehicle control device and method capable of ensuring a stability and reducing driver discomfort in vehicle following control situations.

In accordance with an aspect of the present disclosure, there may be provided a vehicle control device including a lane change determiner configured to determine whether of a possibility of a lane change of a vehicle if a lane change operation of the vehicle initiates in a vehicle following control situation, and a controller configured to, if the lane change of the vehicle is possible, determine a required acceleration for changing a following target in the vehicle following control situation depending on a lane change state of the vehicle based on at least one of vehicle behavior information, lane information, and surrounding vehicle detection information.

In accordance with another aspect of the present disclosure, there may be provided a vehicle control method including determining whether of a possibility of a lane change of a vehicle if a lane change operation of the vehicle initiates in a vehicle following control situation, and determining, if the lane change of the vehicle is possible, a required acceleration for changing a following target in the vehicle following control situation depending on a lane change state of the vehicle based on at least one of vehicle behavior information, lane information, and surrounding vehicle detection information.

According to embodiments of the present disclosure, there may provide a vehicle control device and method capable of ensuring stability of a vehicle and reducing driver discomfort in vehicle following control situations.

BRIEF DESCRIPTION OF THE DRAWINGS

FIG. 4 is a flowchart illustrating an operation of determining a required acceleration for changing a following target in a vehicle following control situation in the case that a lane change is possible according to the present embodiments.

DETAILED DESCRIPTION

Figure 1:
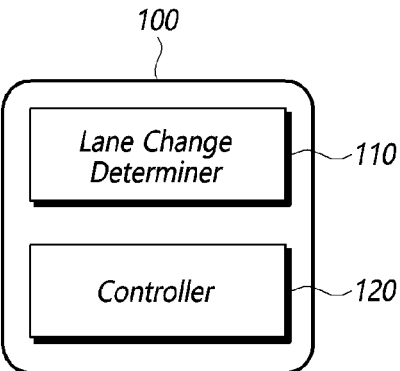
FIG. 1 is illustrates a configuration of a vehicle control device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A target or a following target described in the present specification may refer to a target set for a vehicle following control or a vehicle tracking control when the vehicle is in a vehicle following control situation. Additionally, a vehicle following control situation may refer to a situation in which a vehicle is set to drive by following a specific target, and may be expressed in terms such as cruise control (CC), adaptive cruise control (ACC), of a smart cruise control (SCC). Hereinafter, there will be described as a following control situation, but this is for convenience of explanation. The embodiments may be applied to any situation in which the vehicle's behavior is controlled so that the vehicle follows a specific object.

FIG. 1 is illustrates a configuration of a vehicle control device 100 according to the present embodiments.

Referring to FIG. 1, the vehicle control device 100 according to the present embodiments may include a lane change determiner 110 which determines whether the vehicle can change lanes, that is, a possibility of a lane change in the case that a vehicle's lane change operation is initiated in a vehicle following control situation.

For example, a vehicle following control situation may mean a situation in which a behavior of a vehicle is controlled to follow a preceding target during the vehicle is driving. The behavior of a vehicle may include various actions such as vehicle speed, distance to the preceding target, and starting/stopping the vehicle.

In addition, the lane change determiner 110 may determine whether the vehicle's lane change operation has been initiated in response to receipt of a signal related to the vehicle's lane change behavior. For example, the lane change determiner 110 may determine whether a lane change operation has been initiated based on a turn signal signal. For another example, the lane change determiner 110 may determine whether a lane change operation has been initiated based on a change in vehicle behavior. For example, if a situation in which the vehicle deviates or departs from the lane at a specific angle or more continues for more than a preset time, the lane change determiner 110 may determine that the vehicle is initiating a lane change operation. As another example, if a lane change signal initiated by the driver is received, the lane change determiner 110 may determine whether a lane change operation has been initiated. For example, the driver may instruct the vehicle to change a driving lane through various input methods, and a lane change signal may be initiated by the input.

The lane change determiner 110 may determine that it is impossible for the vehicle to change lanes if another vehicle exists within a specific range preset based on surrounding vehicle detection information.

For example, in the case that the vehicle initiates to change lanes, the lane change determiner 110 may check whether surrounding vehicles exist in a lane to be changed. To this end, the surrounding vehicle detection information may include location information and speed information of vehicles driving around the vehicle.

The lane change determiner 110 may determine whether another vehicle is detected in a lane to be changed, that is in a lane to which the vehicle is trying to change. The lane change determiner 110 may determine that it is possible to change lanes to the corresponding lane if no other vehicles are detected. In contrast, if another vehicle is detected, the lane change determiner 110 may determine whether the other detected vehicle exists within a preset range.

For example, the preset range may be set based on the vehicle. As an example, the preset range may be set by adding a specific offset to the front and rear of the vehicle based on the overall length of the vehicle. The preset range may be set in various ways in advance, or may be variably changed depending on the vehicle speed.

If a part or all of the other vehicles are detected within a preset range, the lane change determiner 110 may determine that the vehicle cannot change lanes to the corresponding lane.

Meanwhile, the vehicle control device 100 may include a controller 120 which determines, if the lane change of the vehicle is possible, a required acceleration for changing a following target in the vehicle following control situation depending on a lane change state of the vehicle based on at least one of vehicle behavior information, lane information, and surrounding vehicle detection information.

The vehicle control device 100 may collect vehicle behavior information, lane information, and surrounding vehicle detection information using various sensors configured in the vehicle.

The controller 120 may determines whether a second target for the vehicle following control exists on a lane to be changed based on surrounding vehicle detection information, and may determine a required acceleration for changing a following target as a required acceleration for a first target for the vehicle following control in a driving lane of the vehicle if it is determined that the second target does not exist.

For example, the controller 120 may determine whether a second target for the vehicle following control exists in a lane to be changed based on the collected surrounding vehicle detection information. That is, the controller 120 may determine whether a second target to be followed after changing lanes exists in the lane to which the vehicle plans to change. For example, the presence of the second target may be determined by various sensing units configured in the vehicle, such as a radar sensor, a camera sensor, and an ultrasonic sensor. However, the sensing unit may not be limited to these sensors.

If it is determined that the second target does not exist, the controller 120 may determine a required acceleration for changing the following target as a required acceleration for a first target subject to vehicle following control in a driving lane. For example, if a second target is not detected in the lane to be changed, the controller 120 may perform a lane change operation based on the required acceleration set based on the first target. That is, the controller 120 can prevent a sudden change in vehicle speed when changing lanes by changing lanes while applying the required acceleration determined according to a preset determination manner based on the first target. If a second target is detected again after changing lanes, the controller 120 may determine the required acceleration based on the second target. Even if the second target is not detected in the process of changing lanes due to the detection limitations of a sensing unit of the vehicle, the second target may be detected to continue the vehicle following control after changing lanes.

Meanwhile, the controller 120 may determine whether a second target for the vehicle following control exists in a lane to be changed based on the collected surrounding vehicle detection information. If it is determined that a second target to be followed exists in the lane to be changed, the controller 120 may determine the required acceleration for changing the following target by comparing a second required acceleration information determined based on the second target and a first required acceleration information determined based on a first target for vehicle following control in a driving lane.

For example, if a vehicle changes lanes, the required acceleration may be set based on the first target currently being followed in the driving lane. After changing lanes, the required acceleration of the vehicle may be set based on the second target selected in the changed lane. Therefore, in the process of changing lanes, the required acceleration set for the vehicle may be suddenly changed. Therefore, in the present disclosure, in order to reduce the risk and driver's feeling of discomfort due to the sudden change in required acceleration during the lane change, the required acceleration set to the vehicle during lane change may be set based on the required acceleration determined based on the first target and the second target, respectively.

The required acceleration in the present specification may refer to a required acceleration value of the vehicle determined by the vehicle following control system in the case that the vehicle is in the vehicle following control situation. The required acceleration may be set in various ways depending on the vehicle following control system, and may also be changed depending on the driver's input signal.

For example, in the case that it is determined that the second target exists, the controller 120 may determine whether the second required acceleration information is greater than or equal to the first required acceleration information. If the second required acceleration information is greater than or equal to the first required acceleration information, the controller 120 may determine the required acceleration for changing the following target as the first required acceleration information. That is, if the second required acceleration is greater than or equal to the first required acceleration, the controller 120 may determine the required acceleration required to be applied while changing lanes as the first required acceleration determined based on the first target. This is because the second required acceleration is greater than the first required acceleration, so that there may be desirable to change lanes at the first required acceleration in order to minimize the vehicle's discomfort while changing the lane. If the lane change is completed, the controller 120 may control the second required acceleration to be applied to the vehicle to maintain the vehicle following control situation based on the second target.

As another example, if the second required acceleration information is less than the first required acceleration information, the controller 120 may determine the required acceleration for changing the following target using the second required acceleration information and a minimum required acceleration information required in the vehicle following control situation.

The minimum required acceleration required in a vehicle following control situation may be set in advance. Alternatively, the minimum required acceleration may be variably changed depending on the vehicle speed based on a preset value.

As an example, if the second required acceleration information is less than the minimum required acceleration information, the controller 120 may determine the required acceleration for changing the following target as the first required acceleration information. For example, the controller 120 may determine whether the second required acceleration information is less than the first required acceleration information and the second required acceleration information is less than the minimum required acceleration information. If the vehicle changes lanes in this state, there may be a risk of collision with the second target, and there may also provide a feeling of discomfort to the driver. Therefore, in this case, the controller 120 may generate a danger signal to warn the driver. Alternatively, the controller 120 may maintain the required acceleration required during the lane change process as the first required acceleration. That is, the controller 120 may set the required acceleration required during the lane change process to be lower than the minimum required acceleration information. However, in order to improve stability with the first required acceleration, the controller 120 may set the required acceleration during the lane change of the vehicle to the first required acceleration. Alternatively, the controller 120 may control the vehicle to follow the first target by the first required acceleration without changing lanes.

As another example, if the second required acceleration information is greater than the minimum required acceleration information and the first required acceleration information is a positive number, the controller 120 may determine the required acceleration for changing the following target by applying ratio information preset for each lane change state to the second required acceleration information.

For example, the lane change state may be classified or distinguished based on a degree of departure of the vehicle from the driving lane. In addition, the required acceleration for changing the following target may be determined by applying the ratio information preset for each of the lane change states to the second required acceleration information. Additionally, the preset ratio information may be set to increase as the degree of departure of the vehicle from the driving lane increases.

For example, the controller 120 may determine the lane change state based on the degree of departure from the driving lane of the vehicle. Generally, when a vehicle changes lanes, the wheels of the vehicle may sequentially cross the lane. For example, since the vehicle changes lanes while maintaining the driving direction, the front and rear wheels of the vehicle may sequentially cross the left or right lane of the driving lane. Accordingly, the controller 120 may determine the lane change state based on a degree of departure of the vehicle wheels from the driving lane. Alternatively, the controller 120 may determine the degree of departure from the driving lane of the vehicle through a sensor installed in the vehicle.

In addition, the controller 120 may determine the required acceleration for changing the following target by applying ratio information preset for each lane change state to the second required acceleration information. For example, preset ratio information may be set to 25%, 50%, 75%, and 100%. However, the preset ratio information is not limited to this case.

For example, in the case that a vehicle changes lanes to the left side of the driving lane, the left front wheel of the vehicle may be the first to depart from the driving lane. Afterwards, sequentially, the left rear wheel of the vehicle departs from the driving lane. Additionally, the right front wheel of the vehicle deviates from the driving lane, and finally, the right rear wheel of the vehicle deviates from the driving lane, completing the lane change.

In this case, the controller 120 may identify the lane change state based on whether each wheel departs from the driving lane. Additionally, the preset ratio may be set to a different value for each lane change state.

The lane change state has been described as four types based on the wheels of the vehicle as above. This is for convenience of explanation, and may be divided into fewer or more than four types. In this case, the preset ratio may also be set to fewer or more than four types depending on the lane change state. That is, the preset ratio and lane change state may be set in a mapping relationship.

In addition, the preset ratio information may be set to increase as the degree of departure from the driving lane increases. The preset ratio information may be a value applied to the second required acceleration, and may be controlled to get closer to the second required acceleration as the vehicle departs from the driving lane. Accordingly, the required acceleration for changing the following target during the lane change process may gradually increase as the vehicle departs from the driving lane.

As another example, in the case that the second required acceleration information is greater than the minimum required acceleration information and the first required acceleration information is a negative number, the controller 120 may determine the required acceleration for changing the following target by summing the first required acceleration information and the second required acceleration information with preset ratio for each lane change state.

For example, the controller 120 may classify the lane change states based on the degree of departure of the vehicle from the driving lane, and may determine the required acceleration for changing the following target by adding or summing the first required acceleration information and the second required acceleration information at a preset ratio for each of the classified lane change states. In this case, the preset ratio may be set so that as the degree of departure from the driving lane increases, a proportion of the second required acceleration increases and a proportion of the first required acceleration decreases.

In addition, the controller 120 may determine the required acceleration for changing the following target by adding the first required acceleration information and the second required acceleration information with the ratio preset for each lane change state. The ratio for each lane change state may be set so that the proportion of the second required acceleration is 25%, 50%, 75%, and 100%, and the proportion of the first required acceleration is 75%, 50%, 25%, and 0%, respectively. However, the preset ratio is not limited to this case. That is, the preset ratio may be set so that the proportion of the second required acceleration gradually increases and the proportion of the first required acceleration gradually decreases according to the lane change state of the vehicle.

Additionally, the preset ratio may be set so that the proportion of the second acceleration increases as the degree of departure of the vehicle from the driving lane increases. The preset ratio may be a value applied in determining the required acceleration for changing the following target during the lane change process by adding the first required acceleration and the second required acceleration, and may be set to gradually approaches the second required acceleration as the vehicle departs from the driving lane. Accordingly, the required acceleration for target change during the lane change process may gradually increase as the vehicle deviates from the driving lane.

According to the vehicle control device of the above-described embodiments, in the lane change process of the vehicle in a vehicle following control situation, there may be identified the location and speed of not only the target vehicle but also surrounding vehicles through a sensor, so that there may reduce driver discomfort and improve vehicle stability.

Embodiments of the operation of the above-described vehicle control device will be described below with reference to the drawings. The embodiments described below may be implemented in whole or in part by each configuration described above. Additionally, one or more embodiments described below may be implemented by the vehicle control device described above in any combination.

Figure 2:
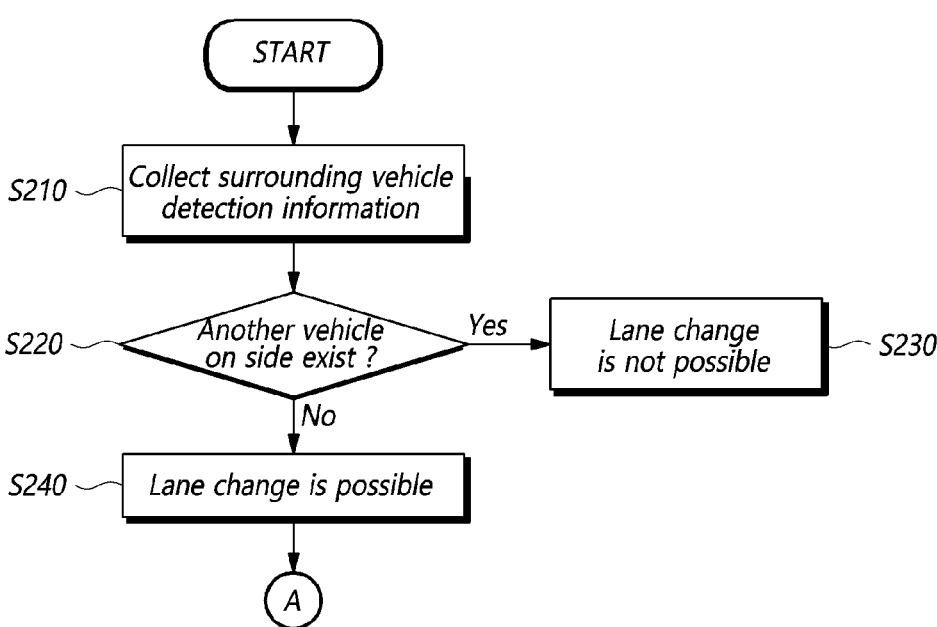
FIG. 2 is a flowchart illustrating an operation for determining whether a lane change is possible according to the present embodiments.
Figure 3:
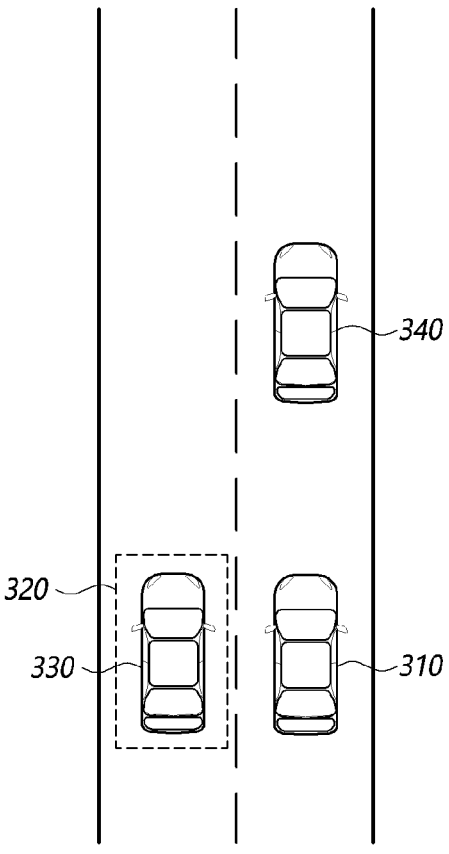
FIG. 3 is illustrates a configuration for determining whether a side vehicle exists according to the present embodiments.

FIG. 2 is a flowchart illustrating an operation for determining whether a lane change is possible according to the present embodiments. FIG. 3 is illustrates a configuration for determining whether a side vehicle exists according to the present embodiments.

Referring to FIG. 2, the lane change determiner may determine that the vehicle cannot change lanes if another vehicle exists within a specific range preset based on surrounding vehicle detection information.

For example, the vehicle control device may collect surrounding vehicle detection information (S210). The surrounding vehicle detection information may be collected by various sensors configured in the vehicle, and may be received by the lane change determiner through a vehicle's internal communication interface. For example, the surrounding vehicle detection information may include information about surrounding vehicles detected from radar and/or cameras. For example, the surrounding vehicle detection information may include speed, distance, vehicle type, etc. of other vehicles driving in the same lane of the vehicle, that is the driving lane of the vehicle and/or different lane.

The vehicle control device may determine whether a side vehicle, which is another vehicle on the side of vehicle, exists based on surrounding vehicle detection information (S220).

For example, if it is determined in step S220 that a side vehicle exists, the vehicle control device may determine that lane change is not possible (S230). As another example, if it is determined in step S220 that there is no another vehicle on the side of the vehicle, the vehicle control device may determine that lane change is possible (S240). This will be described in more detail later with reference to FIG. 3.

FIG. 3 is a diagram for explaining the operation of determining whether a side vehicle exists according to the present embodiments.

Referring to FIG. 3, a specific lateral range 320 may be set to a target lane to be changed based on the vehicle 310. The lateral range 320 may be set in the target lane to be changed by adding a specific offset to the front and rear of the vehicle with reference to the overall length of the vehicle 310. For example, the lateral range 320 may be preset and stored, or may be set to vary depending on the speed of the vehicle 310.

As an example, the lane change determiner may determine that lane change is impossible if a part or all of another vehicle 330 are detected within the lateral range 320. As another example, the lane change determiner may determine that lane change is possible if another vehicle 330 is not detected in the lateral range 320. If it is determined that lane change is impossible, the vehicle control device may control the vehicle to continue following a following target 340 that the vehicle 310 is currently following.

In FIG. 3, there has been described as an example a case in which the possibility of the lane change is determined depending on the existence of another vehicle on the side of the vehicle 310, but the present invention is not limited thereto. Accordingly, the preset range may be set in various ways not only to the side but also in other directions, and may be variably changed depending on the vehicle speed.

Figure 4:
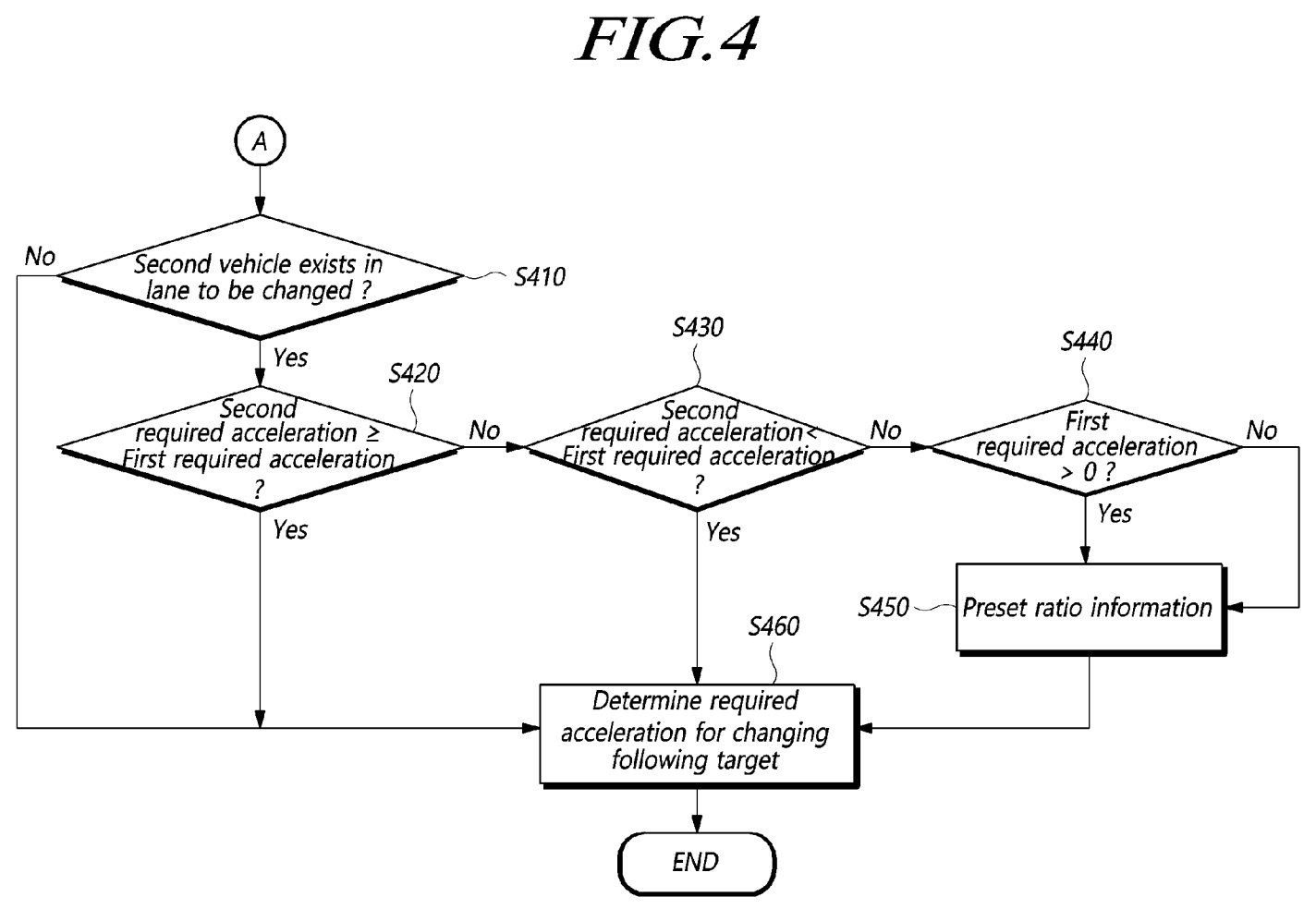
Figure 5:
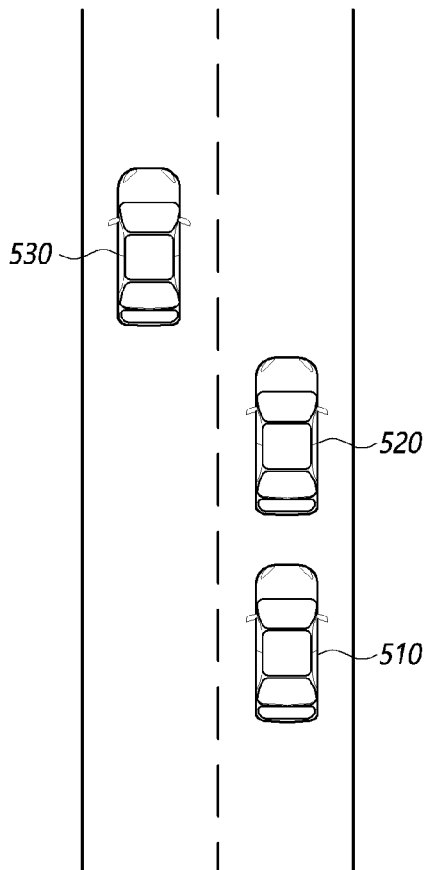
FIG. 5 illustrates a configuration for a case in which a second required acceleration is greater than or equal to a first required acceleration during the operation of determining the required acceleration for changing the following target according to the present embodiments.
Figure 6:
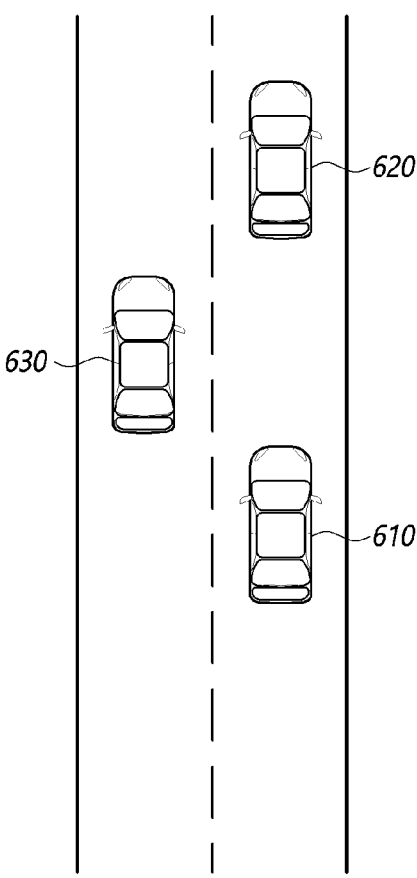
FIG. 6 illustrates a configuration for a case in which a second required acceleration information is less than a first required acceleration information and a second required acceleration information is less than a minimum required acceleration information during the operation of determining the required acceleration for changing the following target according to the present embodiments.

FIG. 4 is a flowchart illustrating an operation of determining a required acceleration for changing a following target in a vehicle following control situation in the case that a lane change is possible according to the present embodiments. FIGS. 5 and 6 are diagrams for explaining the operation of determining first and second required acceleration information and minimum required acceleration information.

Referring to FIG. 4, the controller may determine whether a second target for the vehicle following control exists in the lane to be changed based on surrounding vehicle detection information (S410).

The surrounding vehicle detection information may include information collected through various sensors installed in the vehicle, such as lidar sensors, camera sensors, and radar sensors. The controller may determine whether the second target exists by comprehensively considering the location of the vehicle in the driving lane, the location of the second target, and the layout of the lane, etc., based on the surrounding vehicle detection information.

For example, if it is determined that the second target does not exist, the controller may determine the required acceleration for changing the following target as a first required acceleration for a first target in the driving lane for the vehicle following control (S460). This is to reduce the driver's discomfort due to sudden change in speed of the vehicle after changing lanes and to provide the driver with a feeling of stability.

As another example, if it is determined that a second target exists, the controller may compare a second required acceleration information determined based on the second target and the first required acceleration information determined based on the first target for the vehicle following control in the driving lane (S420). This will be described in more detail later with reference to FIGS. 5 and 6.

For example, in step S420, if the second required acceleration information is greater than or equal to the first required acceleration information, the controller may determine the required acceleration for changing the following target to be the first required acceleration information (S460). This is described in more detail with reference to FIG. 5.

Referring to FIG. 5, a second target 530, a first target 520, and a host vehicle 510 on the driving lane are located in that order in a direction parallel to the lane. That is, the first required acceleration information and the second required acceleration determined based on the relative distance and speed measured by sensors in the host vehicle 510 may be compared with each other, and there may be determined that the second required acceleration information is greater than the first required acceleration information. In this case, the controller may determine the required acceleration for changing the following target as the first required acceleration information in order to minimize the uncomfortable feeling caused by changing lanes of the host vehicle 510.

As another example, if the second required acceleration information is less than the first required acceleration information, the controller may compare the second required acceleration information with a minimum required acceleration information required in the vehicle following control situation to determine the possibility of a collision accident.

For example, the controller may determine whether the second required acceleration information is less than the minimum required acceleration information (S430). In addition, if the second required acceleration information is less than the minimum required acceleration information, the controller may determine the required acceleration for changing the following target as the first required acceleration information (S460). This is described in more detail with reference to FIG. 6.

Referring to FIG. 6, a first target 620, which is the preceding vehicle and current following target on the driving lane, a second target 630, which is another vehicle on the side, and a host vehicle on the driving lane 610 are located in that order in a direction parallel to the lane. That is, when comparing the first required acceleration information and the second required acceleration determined based on the relative distance and speed measured by sensors in the host vehicle 610, there may be determined that the second required acceleration information is less than the first required acceleration information, and the second required acceleration information is also less than the minimum required acceleration information. In this case, if the host vehicle 610 changes lanes to a target lane in which the second target 630 is driving, there may occur a collision accident with the second target 630. Therefore, in this case, the controller may control to generate a warning signal to notify that there is risk when the vehicle changes lanes. The warning signal may be a visual output signal or an auditory output signal, but is not limited thereto. Additionally, the controller may control the host vehicle not to change the following target in this case. That is, the controller may control the vehicle to continuously follow the first target 620. Meanwhile, the controller may determine the required acceleration for changing the following target as first required acceleration information. Alternatively, the controller may determine the required acceleration for changing the following target without changing lanes as the first required acceleration information. In this case, the controller may prevent a collision accident in advance by maintaining the first required acceleration information. Alternatively, in the case of controlling the vehicle not to change lanes, the controller may not determine required acceleration information for changing the following target.

As another example, the controller may determine whether the second required acceleration information is less than the minimum required acceleration information (S430). In addition, if the second required acceleration information is greater than or equal to the minimum required acceleration information, the controller may determine whether the first required acceleration information is a positive number. (S440). The controller may apply preset ratio information according to the result (S450) and determine the required acceleration for changing the following target (S460). The preset ratio information will be described in detail later with reference to FIGS. 7 to 9.

Figure 7:
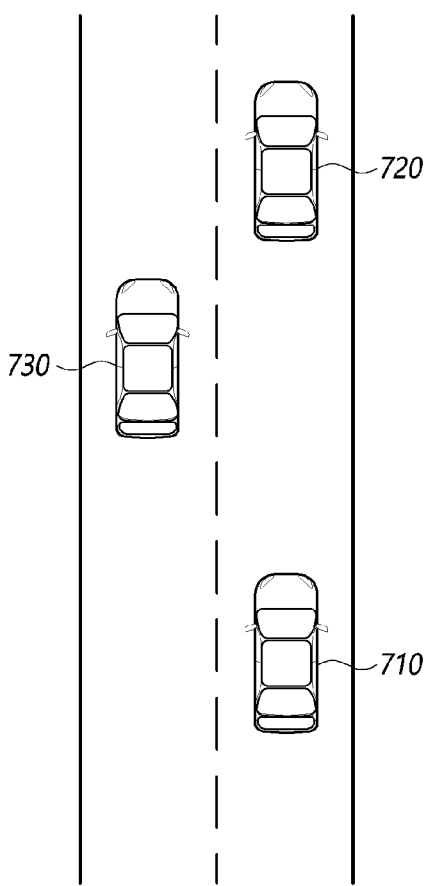
FIG. 7 illustrates a case in which a second required acceleration information is greater than a minimum required acceleration information and a first required acceleration information is a positive number.

FIG. 7 is a diagram for a case in which the second required acceleration information is greater than the minimum required acceleration information and the first required acceleration information is a positive number.

Referring to FIG. 7, in the case of changing the following target to a second target 730 in a situation where a host vehicle 710 is controlled to follow a first target 720, the second target 730 may be located closer to the first target 720.

In this case, the controller may determine and compare the first required acceleration information and the second required acceleration, and may determine that the second required acceleration information is less than the first required acceleration information. Additionally, the controller may determine that the second required acceleration information is greater than or equal to the minimum required acceleration information and the first required acceleration information is a positive number. In this case, in order to follow the second target 730, the vehicle 710 may require a certain level of required acceleration. In this case, the controller may determine the required acceleration for changing the following target by applying preset ratio information for each lane change state to the second required acceleration information.

Figure 8:
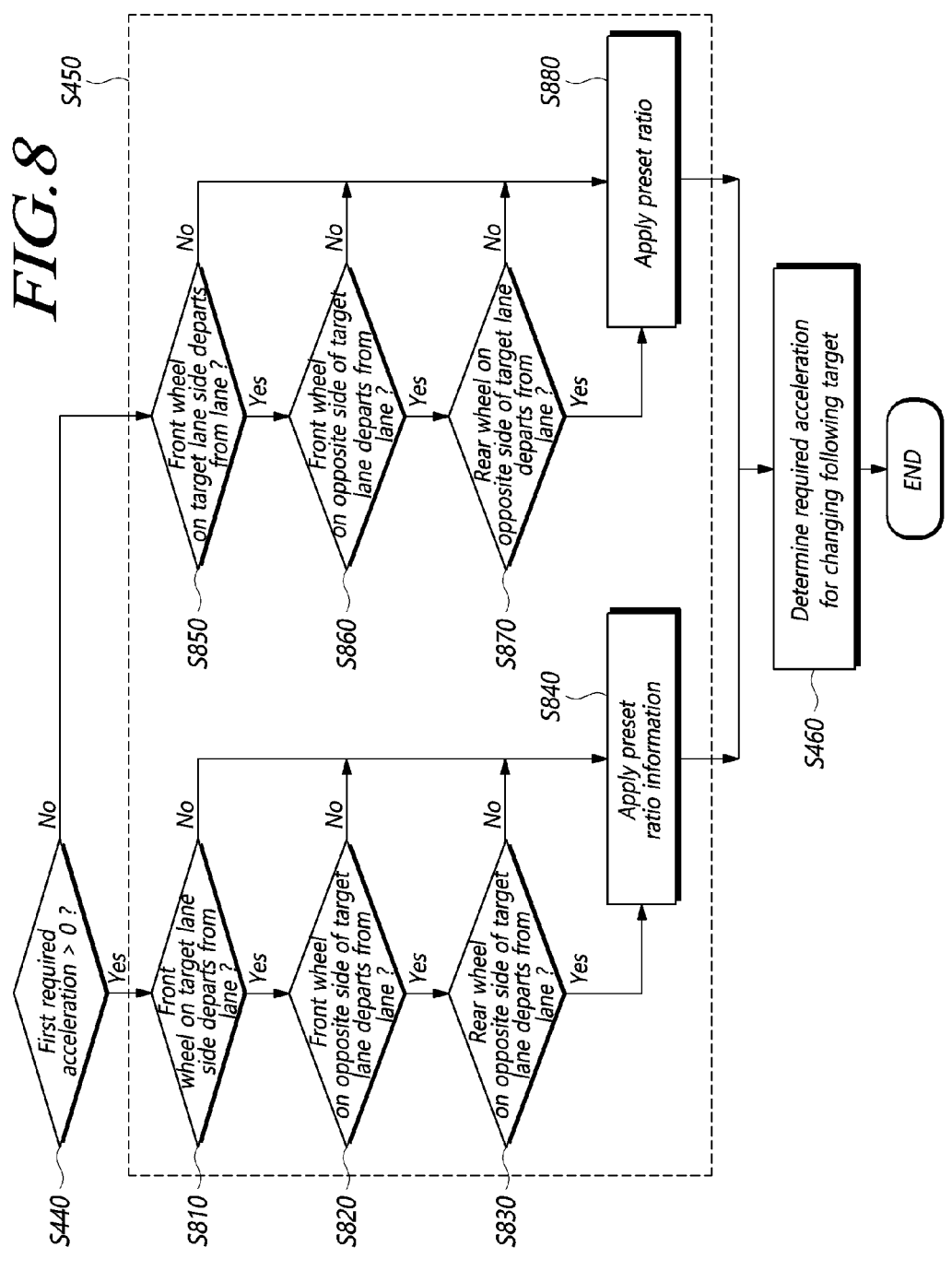
FIG. 8 is a flowchart for determining preset ratio information according to the present embodiments.

FIG. 8 is a flowchart for determining preset ratio information.

Referring to FIG. 8, as an example, in the case that the second required acceleration information is greater than the minimum required acceleration information and the first required acceleration information is a positive number, the controller may determine the required acceleration for changing the following target by applying rate information preset for each lane change state to the second required acceleration information.

For example, the controller may classify the lane change state based on the degree of departure of the host vehicle from the driving lane, and may determine the required acceleration for changing the following target by applying preset rate information for each of the classified lane change states to the second required acceleration information. The preset ratio information may be set to increase as the degree of departure from the driving lane increases.

The controller may classify the lane change state based on the degree of departure of the host vehicle from the driving lane (S810 to S830). The degree of departure from the driving lane will be described with reference to FIG. 9.

Figure 9:
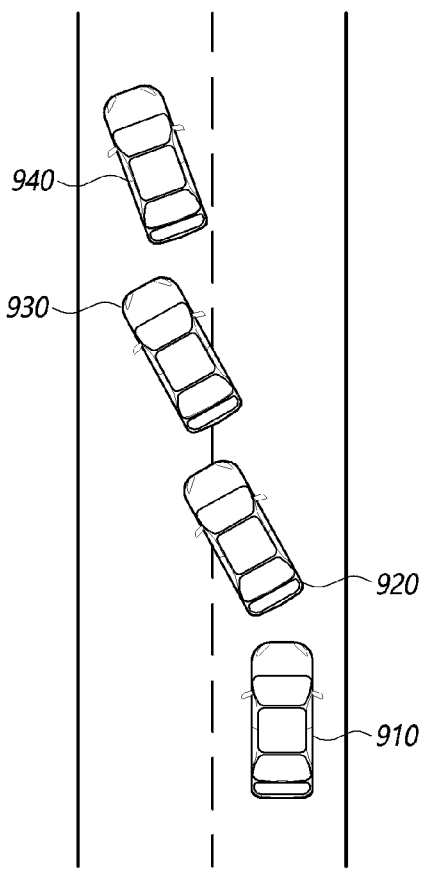
FIG. 9 is a diagram representing a degree of departure from the driving lane of a vehicle according to the present embodiments.

Referring to FIG. 9, the degree of departure from the driving lane of the host vehicle 910 may be distinguished or classified based on the specific position of the host vehicle 910 with respect to the driving lane. The degree of departure from the driving lane may be measured or distinguished through several sensors provided in the host vehicle 910. The degree of departure from the driving lane may be classified and determined based on the number and range of wheels of the host vehicle 910 that deviates from the driving lane.

As an example, the host vehicle 920 in a first position represents a case in which a left front wheel of the host vehicle departs first from a left lane of the driving lane. This case may include cases where not only all but a portion of the left front wheels departs from the left lane of the driving lane. In this case, the host vehicle 920 at the first position may be in a state having an increased degree of departure from the driving lane compared to the host vehicle 910 at the initial position.

As another example, the host vehicle 930 in a second position represents a case where all of the front wheels of the vehicle and only a left rear wheel among the rear wheels of the vehicle depart from the left lane of the driving lane. This case may include cases where not only all but a portion of the right front wheels departs from the left lane. Additionally, this case may include cases where not only all but a portion of the left rear wheel of the vehicle departs from the left lane. In this case, there may be considered that the host vehicle 930 at the second position has a greater degree of deviation from the driving lane than the host vehicle 920 at the first position.

As another example, the host vehicle 940 in a third position represents a case where both the front and rear wheels of the vehicle depart from the left lane of the driving lane. This case may include cases where not only all but a portion of the right rear wheel of the vehicle departs from the driving lane. In this case, there may be considered that the host vehicle 940 in the third position has a greater degree of departure from the driving lane than the host vehicle 930 in the second position.

As above, the lane change state has been described as classified into four types based on the departure of the wheels from the driving lane, but the lane change state may be divided into fewer or more than four types. Additionally, the vehicle's lane change state may be classified based on criteria other than the vehicle's wheel positions. For example, the lane change state may be classified by the degree of departure from the driving lane of the vehicle center point.

The controller may classify the lane change state based on the degree of departure from the driving lane, and apply preset rate information for each lane change state to the second required acceleration information (S840).

For example, the controller may set the preset ratio information to increase as the degree of departure from the driving increases. The preset ratio information may be a value applied to the second required acceleration, and may be set to gradually approach the second required acceleration as the vehicle departs from the driving lane.

Referring to FIG. 8, the controller may determine whether a front wheel close to the driving lane have entered a target lane, that is, the lane to be changed (S810). That is, the controller may determine whether, among the front wheels of the host vehicle, the front wheel close to the target lane has left the driving lane and entered the target lane.

In step S810, if it is determined that the front wheel close to the driving lane is not departed from the driving lane, the controller may apply 25%, which is preset ratio information, to the second required acceleration. For example, if the controller determines that the vehicle is in an initial lane change state among various lane change states, the controller may apply a preset rate to the second required acceleration. In this case, the preset ratio may be set to a lower value than in the case of a later stage, that is, in another lane change state.

In step S810, if it is determined that the front wheel close to the driving lane is departed from the driving lane and enters the target lane, the controller may determine whether all front wheels have departed from the driving lane and entered the target lane (S820). That is, the controller may determine whether only one of the front wheels has departed from the driving lane and entered the target lane.

In step S820, if it is determined that not all of the front wheels have departed from the driving lane and entered the target lane, the controller may apply 50%, which is preset ratio information, to the second required acceleration. Referring to FIG. 9, this may be the case where the host vehicle 920 is located at the first position. That is, if only one of the front wheels of the vehicle departs from the driving lane and changes to the target lane, a higher ratio value than the ratio value applied in step S810 may be applied.

In step S820, if it is determined that all front wheels have departed from the driving lane to the target lane, the controller may determine whether all rear wheels have departed from the driving lane to the target lane (S830).

In step S830, if all of the front wheels and only one of both the rear wheels depart from the driving lane to the target lane, the controller may apply 75%, which is preset ratio information, to the second required acceleration. Referring to FIG. 9, this may be a case where the host vehicle 930 is in the second position. That is, if only one of the rear wheels of the vehicle departs from the driving lane and changes to the target lane, a higher ratio value than the ratio value applied in step S820 may be applied.

In step S830, if the controller determines that all of the front wheels and rear wheels have departed from the driving lane to the target lane, the controller may apply 100%, which is preset ratio information, to the second required acceleration. Referring to FIG. 9, this may be the case where the host vehicle 940 is in the third position. In this case, there may be considered that the vehicle has completed changing lanes to the target lane. Accordingly, the controller may determine the required acceleration for changing the following target as the second required acceleration information. Referring to FIG. 8, the controller may classify lane change states according to the above-described determination method based on the degree of departure of the vehicle from the driving lane, and apply preset ratio information for each lane change state to the second required acceleration information. (S840). The preset ratio information may be set to increase as the degree of departure from driving lane increases, but is not limited thereto.

As above, the controller may control the vehicle by classifying the process of the vehicle changing lanes and applying different rate information to the second required acceleration for each step to determine the required acceleration for changing the following target. Through this, it is possible to prevent the feeling of discomfort caused by sudden changes in required acceleration.

As another example, if the second required acceleration information is greater than the minimum required acceleration information and the first required acceleration information is a negative number, the controller may determine the required acceleration for changing the following target by adding or summing the first required acceleration information and the second required acceleration information with a preset rate for each lane change state.

For example, the controller may classify the lane change state based on the degree of departure from the driving lane of the vehicle, and sum the first required acceleration information and the second required acceleration information at a preset rate for each lane change state to determine the required acceleration for changing the following target. The preset ratio may be set so that as the degree of departure from the driving lane increases, the proportion of the second required acceleration increases and the proportion of the first required acceleration decreases.

The controller may classify the lane change state based on the degree of departure of the vehicle from the driving lane (S850 to S870). A detailed description thereof has been described above with reference to FIG. 9.

The controller may classify the lane change state based on the degree of departure from the driving lane, and apply a preset ratio for each lane change state to the sum of the first required acceleration information and the second required acceleration information (S880).

For example, the controller may set the preset ratio so that as the degree of departure from the driving lane increases, the proportion of the second required acceleration increases and the proportion of the first required acceleration decreases.

Referring to FIG. 8, the controller may determine whether the front wheel close to the driving lane departs from the driving lane first and enters the target lane (S850).

Step S850 may be correspondent with step S810. Additionally, step S860 may be correspondent with step S820, and step S870 may be correspondent with step S830. That is, the operation of determining the lane change state of the vehicle may be correspondent with the determination operation of steps S810 to S830. Alternatively, lane change states may be classified in steps S850 to S870 based on a different manner in steps S810 to S830. Alternatively, unlike steps S810 to S830, steps S850 to S870 may have more classified lane change states. For example, in steps S850 to S870, the lane change state may be classified based on the vehicle's position sensor, etc. For another example, steps S850 to S870 may include five or more lane change states, unlike steps S810 to S830. Hereinafter, steps S850 to S870 are explained assuming the same state classification as steps S810 to S830, but are not limited thereto.

For example, in step S850, if the controller determines that the front wheel close to the driving lane has not departed from the driving lane to the target lane, the controller may apply a preset ratio of 25% to the second required acceleration and apply a preset ratio of 75% to the first requested acceleration to the first requested acceleration.

In step S850, if it is determined that the front wheel close to the driving lane has departed from the driving lane to the target lane, the controller may determine whether all of the front wheels have departed from the driving lane and entered the target lane (S860).

In step S860, if it is determined that not all of the front wheels have departed from the target lane, the controller may apply a preset ratio of 50% to the first and second required accelerations, respectively. Referring to FIG. 9, this case may be a case in which the host vehicle 920 is located in the first position.

In step S860, if it is determined that all front wheels have departed from the target lane, the controller may determine whether all rear wheels have departed from the driving lane (S870).

In step S870, if all of the front wheels and only one of the rear wheels depart from the driving lane to the target lane, the controller may apply a preset ratio of 75% to the second required acceleration and applies a preset ratio of 25% to the first required acceleration information. Referring to FIG. 9, this case may be a case in which the host vehicle 930 is in the second position.

In step S870, if the controller determines that all of the front wheels and rear wheels depart from the driving lane to the target lane, a preset rate of 100% may be applied to the second required acceleration. This case may be a case in which the host vehicle 940 is in the third position.

The controller may determine the required acceleration for changing the following target by summing the second required acceleration and first required acceleration information to which the respective ratios are applied in steps S850 to S870 (S460).

Referring to FIG. 8, the controller may classify lane change states according to the above-described determination method based on the degree of departure from the driving lane of the vehicle, and apply a preset ratio for each lane change state to the sum of the first required acceleration and the second required acceleration (S840). The preset ratio may be set so that as the degree of departure from the driving lane increases, a proportion of the second required acceleration gradually increases and a proportion of the first required acceleration gradually decreases, but is not limited thereto.

As described above, according to the embodiments of the present disclosure, it is possible to reduce the feeling of discomfort when changing the following control target during the lane change in a vehicle following control situation. Hereinafter, it will be described the operation of the above-described vehicle control device again in terms of method with reference to the drawings. The operations described with reference to FIGS. 1 to 9 may be performed in time series by the method described below.

Figure 10:
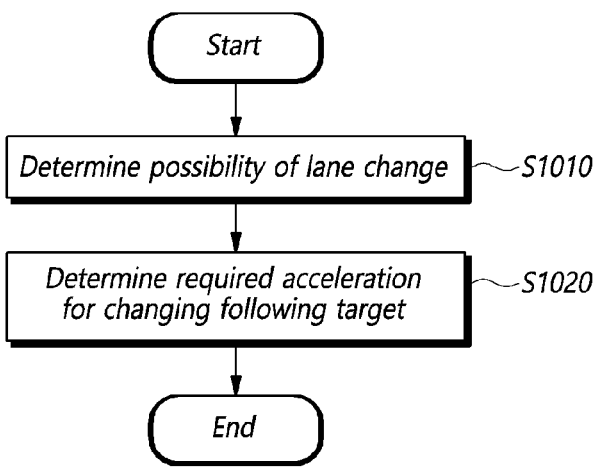
FIG. 10 is a flowchart of a vehicle control method according to the present embodiments.

FIG. 10 is a flowchart of a vehicle control method according to the present embodiments.

Referring to FIG. 10, the vehicle control method according to the present embodiments may include determining whether of the possibility of a lane change of a vehicle if a lane change operation is initiated in a vehicle following control situation (S1010).

The lane change determination step S1010 may include determining whether a lane change operation of the vehicle has been initiated in response to reception of a signal related to the lane change operation of the vehicle. For example, the lane change determination step may include determining whether a lane change operation has been initiated based on a turn signal signal. For another example, the lane change determination step may include determining whether a lane change operation has been initiated based on a change in vehicle behavior. For example, if a situation in which the vehicle departs from the driving lane at a specific angle continues for more than a preset time, there may be determined that the vehicle is initiating a lane change operation. As another example, the lane change determination step may include determining whether a lane change operation has been initiated in response to the reception of a lane change signal initiated by the driver. For example, the driver may instruct the vehicle to change the driving lane through various input methods, and a lane change signal may be triggered.

The lane change determination step may include determining that the lane change of the vehicle is not possible if another vehicle exists within a specific range preset based on surrounding vehicle detection information.

For example, the lane change determination step may include determining whether another vehicle exists in a target lane, which is a lane to which the vehicle tried to change, if the vehicle begins to change lanes. In this case, the surrounding vehicle detection information may include location information and speed information of another vehicles driving around the vehicle.

The lane change determination step may include determining whether another vehicle is detected in the target lane to be changed. The lane change determination step may include determining that lane change to the target lane is possible if no other vehicles are detected in the target lane. Alternatively, the lane change determination step may further include determining whether the other detected vehicle exists within a preset range if another vehicle is detected in the target lane.

For example, the preset range may be set based on a host vehicle. As an example, the preset range may be set by adding a specific offset to the front and rear of the host vehicle based on the overall length of the host vehicle. The preset range may be set in various ways in advance, or may be variably changed depending on a speed of the host vehicle or another vehicle.

The lane change determination step may include determining that it is impossible for the vehicle to change lanes to the corresponding target lane if a portion or all of the other vehicles are detected within a preset range.

Meanwhile, the vehicle control method may include determining, if the lane change of the vehicle is possible, a required acceleration for changing a following target in the vehicle following control situation depending on a lane change state of the vehicle based on at least one of vehicle behavior information, lane information, and surrounding vehicle detection information (S1020).

The vehicle control device may collect vehicle behavior information, lane information, and surrounding vehicle detection information using various sensors configured in the vehicle.

The required acceleration determination step may include determining whether a second target for the vehicle following control exists in the lane to be changed based on surrounding vehicle detection information, and determining, if it is determined that the second target does not exist, the required acceleration for changing the following target as a first required acceleration for the first target in the driving lane.

For example, the required acceleration determination step may include determining whether a second target for the vehicle following control exists in the lane to be changed based on the collected surrounding vehicle detection information. The required acceleration determination step may include determining whether a second target to be followed after the lane change exists in a target lane to which the vehicle is to change. For example, the presence of the second target may be determined by various sensing units configured in the vehicle, such as a radar sensor, a camera sensor, and an ultrasonic sensor. However, the sensing unit is not limited thereto.

The required acceleration determining step may include, if it is determined that the second target does not exist, determining the required acceleration for changing the following target as the required acceleration for the first target for the vehicle following control in the driving lane. For example, the required acceleration determining step may include performing a lane change operation based on the required acceleration determined based on the first target if the second target is not detected in the lane to be changed. That is, in the required acceleration determination step, there may be prevented a sudden change in vehicle speed in changing lanes by changing lanes while applying the required acceleration determined according to a preset determination method based on the first target. If the second target is detected again after changing lanes, the required acceleration may be determined based on the second target. This is because even if the second target is not detected in the process of changing lanes due to the detection limitations of the vehicle's sensing unit, there may be detected a second target for continuing the following control after changing lanes.

Meanwhile, the required acceleration determination step may include determining whether a second target for the vehicle following control exists in the lane to be changed based on surrounding vehicle detection information. In addition, the required acceleration determination step may include, if it is determined that the second target exists, determining the required acceleration for changing the following target by comparing the second required acceleration information determined based on the second target and the first required acceleration information determined based on the first target for the vehicle following control in the driving lane.

For example, when a vehicle plans to change lanes, the required acceleration may be first set based on the first target being followed in the current driving lane. Then, when changing lanes, the required acceleration of the vehicle may be set based on the second target selected in the changed lane. Therefore, in the process of changing lanes, the required acceleration set for the vehicle may change drastically. Therefore, in the present disclosure, in order to reduce the accident risk and driver's feeling of discomfort due to the sudden change in required acceleration while the vehicle changes lanes, the required acceleration of the vehicle during the lane change may be set based on the required acceleration determined based on the first target and the second target, respectively.

As an example, the required acceleration determination step may include, if it is determined that the second target exists, determining whether the second required acceleration information is greater than or equal to the first required acceleration information, and determining the required acceleration for changing the following target as the first required acceleration information if the second required acceleration information is greater than or equal to the first required acceleration information. For example, in the required acceleration determination step, if the second required acceleration is greater than or equal to the first required acceleration, the required acceleration of a vehicle during changing lanes may be determined as the first required acceleration determined based on the first target. This is because the second required acceleration is greater than the first required acceleration, so there may be desirable to change lanes at the first required acceleration in order to minimize the vehicle's lane change discomfort. If the lane change is completed, the vehicle following control situation may be maintained based on the second target by applying the second required acceleration to the vehicle.

As another example, the required acceleration determination step may include, if the second required acceleration information is less than the first required acceleration information, determining the required acceleration for changing the following target using the second required acceleration information and a minimum required acceleration information required in the vehicle following control situation.

The minimum required acceleration required in the vehicle following control situation may be preset. Alternatively, the minimum required acceleration may be variably changed depending on the vehicle speed based on a preset value.

As an example, the required acceleration determination step may include determining the required acceleration for changing the following target as the first required acceleration information if the second required acceleration information is less than the minimum required acceleration information. For example, the required acceleration determination step may include determining whether the second required acceleration information is less than the first required acceleration information and the second required acceleration information is less than the minimum required acceleration information. If the vehicle changes lanes in this case, there may be a risk of collision with the second target, and may also provide a great feeling of discomfort to the driver. Therefore, in this case, a danger signal may be generated to warn the driver. Alternatively, the required acceleration required during the lane change process may be maintained as the first required acceleration. That is, the required acceleration may be set lower than the minimum required acceleration information. Alternatively, in order to improve stability, the required acceleration while changing lanes may be set to the first required acceleration. Alternatively, the required acceleration determination step may include controlling the vehicle to follow the first target at a first required acceleration without performing a lane change.

As another example, the required acceleration determination step may include, if the second required acceleration information is greater than the minimum required acceleration information and the first required acceleration information is a positive number, determining a required acceleration for changing the following target by applying ratio information preset for each lane change state to the second required acceleration information.

For example, the required acceleration determination step may include classifying the lane change states based on the degree of departure of the vehicle from the driving lane, and determining a required acceleration for changing the following target by applying ratio information preset for each lane change state to second required acceleration information. In this case, the preset ratio information may be set to increase as the degree of departure from the driving lane increases.

For example, in the step of determining the required acceleration, the lane change state may be classified based on the degree of departure from the driving lane. Generally, when a vehicle changes lanes, the wheels of the vehicle may sequentially cross the lane. For example, since the vehicle changes lanes while maintaining the driving direction of the vehicle, the front and rear wheels of the vehicle change lanes sequentially. Accordingly, the lane change state may be identified or classified based on the degree of departure of the vehicle's wheels from the driving lane. Alternatively, in the step of determining the required acceleration, the degree of departure from the driving lane may be determined through a sensor installed in the vehicle.

Additionally, the required acceleration determination step may include determining the required acceleration for changing the following target by applying ratio information preset for each lane change state to second required acceleration information. For example, preset ratio information may be set to 25%, 50%, 75%, and 100% for each lane change state. However, the preset ratio information is not limited thereto.

For example, in the case that a vehicle changes lanes to the left side of the driving lane, the left front wheel of the vehicle may be the first to depart from the driving lane. Afterwards, sequentially, the left rear wheel of the vehicle departs from the driving lane. Additionally, the right front wheel of the vehicle departs from the driving lane, and finally, the right rear wheel of the vehicle departs from the driving lane to complete the lane change.

In this case, the lane change state may be classified based on whether each wheel departs from driving lane. Additionally, the preset ratio may also be set to a different value for each lane change state.

In addition, the preset ratio information may be set to increase as the degree of departure of the vehicle from the driving lane increases. The preset ratio information may be a value applied to the second required acceleration, and may be set to get closer to the second required acceleration as the vehicle departs from the driving lane. Accordingly, the required acceleration for changing the following target during the lane change process gradually increases as the vehicle departs from the driving lane.

As another example, the required acceleration determination step may include, if the second required acceleration information is greater than or equal to the minimum required acceleration information and the first required acceleration information is a negative number, determining the required acceleration for changing the following target by summing the first required acceleration information and the second required acceleration information with a preset rate for each lane change state.

For example, the required acceleration determination step may include classifying the lane change states based on the degree of departure of the vehicle from the driving lane, and determining the required acceleration for changing the following target by summing the first required acceleration information and the second required acceleration information with a preset rate for each lane change state. In this case, the preset ratio may be set so that as the degree of departure from the driving lane increases, a proportion of the second required acceleration increases and a proportion of the first required acceleration decreases.

In addition, the required acceleration determination step may include determining the required acceleration for changing the following target by summing the first required acceleration information and the second required acceleration information with a preset rate for each lane change state. The preset ratio may be set so that the proportion of the second required acceleration is 25%, 50%, 75%, and 100%, and the proportion of the first required acceleration is 75%, 50%, 25%, and 0% for each lane change state. However, the preset ratio is not limited thereto. The preset ratio may be set so that the proportion of the second required acceleration gradually increases and the proportion of the first required acceleration gradually decreases according to changes in the lane change state of the vehicle.

In addition, the preset ratio may be set so that the proportion of the second acceleration increases as the degree of departure from the driving lane increases. The preset ratio may be a value applied to the sum of the first required acceleration and the second required acceleration, and may be set so that the required acceleration determined as the vehicle departs from the driving lane gradually approaches the second required acceleration. Accordingly, the required acceleration for target change during the lane change process may gradually increase as the vehicle departs from the driving lane.

The vehicle control method according to the above-described embodiments relates to changing lanes of a vehicle in a vehicle following control situation. According to the vehicle control device and method according to the embodiments, there may identified the location and speed of the target vehicle and surrounding vehicles through sensors and control the required acceleration the host vehicle while changing lanes, thereby reducing the feeling of discomfort in changing lanes and improving the stability of the vehicle.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle control device comprising:
a processor configured to:
determine whether of a possibility of a lane change of a vehicle based on an existence of a surrounding vehicle in a lane to be changed if a lane change operation of the vehicle initiates in a vehicle following control situation;
determine, if the lane change of the vehicle is possible, a required acceleration for changing a following target in the vehicle following control situation depending on a lane change state of the vehicle based on at least one of vehicle behavior information, lane information, or surrounding vehicle detection information; and
control the vehicle to follow the following target according to the determined required acceleration,
wherein the processor determines whether a second target for the vehicle following control exists on a lane to be changed based on the surrounding vehicle detection information, and determines the required acceleration for changing the following target by comparing a second required acceleration information determined based on the second target and a first required acceleration information determined based on a first target for vehicle following control in a driving lane in response to the existence of the second target,
wherein, if the second required acceleration information is greater than or equal to the first required acceleration information, the processor determines the required acceleration for changing the following target as the first required acceleration information, and
wherein, if the second required acceleration information is greater than or equal to a minimum required acceleration information required in the vehicle following control situation and the first required acceleration information is a positive number, the processor determines the required acceleration for changing the following target by applying a ratio information preset for each lane change state to the second required acceleration information.

2. The vehicle control device of claim 1, wherein, if another vehicle exists within a specific range preset based on the surrounding vehicle detection information, the processor determines that the lane change of the vehicle is not possible.

3. The vehicle control device of claim 1, wherein the processor determines the required acceleration for changing the following target as a required acceleration for the first target for the vehicle following control in the driving lane in response to the non-existence of the second target.

4. A vehicle control device comprising a processor configured to:

determine whether of a possibility of a lane change of a vehicle based on an existence of a surrounding vehicle in a lane to be changed if a lane change operation of the vehicle initiates in a vehicle following control situation;

determine, if the lane change of the vehicle is possible, a required acceleration for changing a following target in the vehicle following control situation depending on a lane change state of the vehicle based on at least one of vehicle behavior information, lane information, or surrounding vehicle detection information; and control the vehicle to follow the following target according to the determined required acceleration, wherein the processor determines whether a second target for the vehicle following control exists on a lane to be changed based on the surrounding vehicle detection information, and determines the required acceleration for changing the following target by comparing a second required acceleration information determined based on the second target and a first required acceleration information determined based on a first target for vehicle following control in a driving lane in response to the existence of the second target, wherein, if the second required acceleration information is less than the first required acceleration information, the processor determines the required acceleration for changing the following target using the second required acceleration information and a minimum required acceleration information required in the vehicle following control situation, and wherein, if the second required acceleration information is greater than or equal to the minimum required acceleration information and the first required acceleration information is a positive number, the processor determines the required acceleration for changing the following target by applying a ratio information preset for each lane change state to the second required acceleration information.

5. The vehicle control device of claim 4, wherein, if the second required acceleration information is less than the minimum required acceleration information, the processor determines the required acceleration for changing the following target as the first required acceleration information.

6. The vehicle control device of claim 4, wherein the processor classifies the lane change state based on a degree of departure of the vehicle from the driving lane, and determines the required acceleration for changing the following target by applying ratio information preset for each lane change state to the second required acceleration information, and wherein the ratio information is set to increase as the degree of departure from the driving lane increases.

7. The vehicle control device of claim 4, wherein, if the second required acceleration information is greater than or equal to the minimum required acceleration information and the first required acceleration information is a negative number, the processor determines the required acceleration for changing the following target by summing the first required acceleration information and the second required acceleration information with a preset ratio for each lane change state.

8. The vehicle control device of claim 7, wherein the processor classifies the lane change state based on a degree of departure of the vehicle from the driving lane, and determines the required acceleration for changing the following target by applying ratio information preset for each lane change state, and wherein the ratio is set so that as the degree of departure from the driving lane increases, a proportion of the second required acceleration increases and a proportion of the first required acceleration decreases.

9. A vehicle control method comprising:

determining whether of a possibility of a lane change of a vehicle if a lane change operation of the vehicle initiates in a vehicle following control situation;

determining, if the lane change of the vehicle is possible, a required acceleration for changing a following target in the vehicle following control situation depending on a lane change state of the vehicle based on at least one of vehicle behavior information, lane information, or surrounding vehicle detection information; and controlling the vehicle to follow the following target according to the determined required acceleration, wherein determining the required acceleration comprises:

determining whether a second target for the vehicle following control exists on a lane to be changed based on the surrounding vehicle detection information; and determining the required acceleration for changing the following target by comparing a second required acceleration information determined based on the second target and a first required acceleration information determined based on a first target for vehicle following control in a driving lane in response to the existence of the second target, wherein determining the required acceleration comprises, if the second required acceleration information is greater than or equal to the first required acceleration information, determining the required acceleration for changing the following target as the first required acceleration information, and wherein determining the required acceleration comprises, if the second required acceleration information is greater than or equal to a minimum required acceleration information required in the vehicle following control situation and the first required acceleration information is a positive number, determining the required acceleration for changing the following target by applying a ratio information preset for each lane change state to the second required acceleration information.

10. The vehicle control method of claim 9, wherein determining whether of the possibility of the lane change comprises determining that the lane change of the vehicle is not possible if another vehicle exists within a specific range preset based on the surrounding vehicle detection information.

11. The vehicle control method of claim 9, wherein determining the required acceleration comprises:

determining the required acceleration for changing the following target as a required acceleration for the first target for the vehicle following control in the driving lane in response to the non-existence of the second target.

12. The vehicle control method of claim 9, wherein determining the required acceleration comprises, if the second required acceleration information is less than the first required acceleration information, determining the required acceleration for changing the following target using the second required acceleration information and the minimum required acceleration information.

13. The vehicle control method of claim 12, wherein determining the required acceleration comprises, if the second required acceleration information is less than the minimum required acceleration information, determining the required acceleration for changing the following target as the first required acceleration information.

14. The vehicle control method of claim 12, wherein determining the required acceleration comprises, if the second required acceleration information is greater than or equal to the minimum required acceleration information and the first required acceleration information is a negative number, determining the required acceleration for changing the following target by summing the first required acceleration information and the second required acceleration information with a preset ratio for each lane change state.

* * * * *